(12) United States Patent
Bourqui

(10) Patent No.: US 11,679,646 B2
(45) Date of Patent: Jun. 20, 2023

(54) METHOD FOR DRIVING AN ACTUATOR OF AN HVAC SYSTEM

(71) Applicant: JOHNSON ELECTRIC INTERNATIONAL AG, Murten (CH)

(72) Inventor: Yvan Bourqui, Corminboeuf (CH)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 2 days.

(21) Appl. No.: 16/827,055

(22) Filed: Mar. 23, 2020

(65) Prior Publication Data

US 2020/0223287 A1 Jul. 16, 2020

Related U.S. Application Data

(62) Division of application No. 15/442,045, filed on Feb. 24, 2017, now abandoned.

(30) Foreign Application Priority Data

Feb. 25, 2016 (GB) ...................................... 1603283

(51) Int. Cl.
*B60H 1/00* (2006.01)
*H02P 21/06* (2016.01)
(Continued)

(52) U.S. Cl.
CPC ..... *B60H 1/00871* (2013.01); *B60H 1/00857* (2013.01); *H02P 21/06* (2013.01);
(Continued)

(58) Field of Classification Search
CPC ............ B60H 1/00871; B60H 1/00857; B60H 1/3414; B60H 1/00842; B60H 2001/3471;
(Continued)

(56) References Cited

U.S. PATENT DOCUMENTS 3,992,961 A * 11/1976 Saito ....................... F16H 57/12
74/409
4,507,595 A * 3/1985 Rozsa .................... G05B 19/23
318/630
(Continued)

FOREIGN PATENT DOCUMENTS

CN 201674450 U 12/2010
CN 102467101 A 5/2012
(Continued)

*Primary Examiner* — Edelmira Bosques
*Assistant Examiner* — Frances F. Hamilton
(74) *Attorney, Agent, or Firm* — Muncy, Geissler, Olds & Lowe, P.C.

(57) ABSTRACT

A method for driving an actuator of an HVAC system having a region of mechanical play is provided, and which comprises the steps of: a] monitoring a position of a movable member of the HVAC system or at least one rotatable element of the actuator to determine when the region of mechanical play has been entered or exited; and b] ramping a drive power to the actuator between a zero-velocity drive power and a steady-state-velocity drive power during the region of mechanical play. The HVAC system implementing the above method is not only capable of reducing the noise produced by an HVAC system, but is also capable of reducing an over-powering of the actuator when there is a low load on the system.

8 Claims, 4 Drawing Sheets

(51) Int. Cl.
  *H02P 31/00* (2006.01)
  *H02P 23/20* (2016.01)
  *B60H 1/34* (2006.01)
(52) U.S. Cl.
  CPC ............ *H02P 31/00* (2013.01); *B60H 1/3414* (2013.01); *B60H 2001/3471* (2013.01); *G05B 2219/41059* (2013.01); *H02P 23/20* (2016.02)
(58) Field of Classification Search
  CPC ... B60H 2001/006; H02P 23/20; H02P 31/00; H02P 21/06; G05B 2219/41059; G05B 23/00; G05B 2219/37476; G05B 2219/41032; G05B 2219/41061; G05B 2219/41078; G05B 2219/41082; G05B 2219/41265; G05B 2219/42003
  USPC .......................................................... 454/75
  See application file for complete search history.

(56) References Cited

U.S. PATENT DOCUMENTS

| | | | | |
|---|---|---|---|---|
| 4,544,870 A * | 10/1985 | Kearns | ............... | B60S 1/482 15/DIG. 15 |
| 4,558,265 A * | 12/1985 | Hayashida | ........... | G05B 19/416 318/602 |
| 4,857,816 A * | 8/1989 | Rogozinski | ............ | B25J 9/1641 318/632 |
| 5,015,935 A * | 5/1991 | Iwashita | ............... | G05B 19/404 318/632 |
| 5,101,146 A * | 3/1992 | Teshima | ............... | G05B 19/404 318/572 |
| 5,204,602 A * | 4/1993 | Iwashita | ............... | G05B 19/404 318/561 |
| 5,506,768 A | 4/1996 | Seem et al. | | |
| 5,742,144 A * | 4/1998 | Kato | .................... | G05B 19/404 318/569 |
| 5,767,645 A * | 6/1998 | Park | ..................... | G05B 19/404 318/560 |
| 5,847,531 A * | 12/1998 | Hoffsommer | .......... | G01D 11/14 318/696 |
| 5,906,541 A * | 5/1999 | Mizuno | ............... | B60H 1/00835 454/75 |
| 5,977,732 A * | 11/1999 | Matsumoto | .......... | H02H 7/0851 318/434 |
| 6,107,771 A * | 8/2000 | Maeda | ............... | G05B 19/404 318/600 |
| 6,569,059 B1 * | 5/2003 | Ito | ........................ | B60W 10/06 477/107 |
| 6,570,351 B2 * | 5/2003 | Miyazaki | ................ | H02P 6/182 318/400.1 |
| 6,580,244 B2 * | 6/2003 | Tanaka | ............... | G05B 19/404 318/560 |
| 6,593,719 B2 * | 7/2003 | Satta | ........................ | H02P 1/00 318/609 |
| 6,597,141 B1 * | 7/2003 | Wilson-Jones | ........... | H02P 6/16 417/42 |
| 6,701,212 B2 * | 3/2004 | Shiba | ................... | G05B 19/404 700/193 |
| 6,920,408 B2 * | 7/2005 | Yutkowitz | ............ | G05B 19/404 702/105 |
| 7,005,814 B2 * | 2/2006 | Nakai | ................... | H02P 6/24 318/400.28 |
| 7,033,268 B2 | 4/2006 | Caliendo et al. | | |
| 7,190,138 B2 * | 3/2007 | Kamio | ..................... | F16H 61/32 318/445 |
| 7,199,541 B2 * | 4/2007 | Špička | ..................... | B60S 1/08 15/250.12 |
| 7,557,530 B2 * | 7/2009 | Tesch | ..................... | H02P 6/185 318/400.15 |
| 7,567,051 B2 * | 7/2009 | Hori | ........................ | F16H 61/32 318/432 |
| 7,944,158 B2 * | 5/2011 | Jiang | ...................... | H02P 5/747 318/85 |
| 7,990,088 B2 * | 8/2011 | Isobe | .................. | H02P 21/0025 318/400.11 |
| 8,467,942 B2 * | 6/2013 | Kawaguchi | ............. | F16H 57/12 701/50 |
| 8,587,170 B2 | 11/2013 | Caliendo et al. | | |
| 8,632,017 B2 | 1/2014 | Kucera et al. | | |
| 8,764,529 B2 | 7/2014 | Cook et al. | | |
| 8,791,661 B2 * | 7/2014 | Duits | .................... | F16H 25/2015 318/466 |
| 8,847,533 B2 | 9/2014 | Mori et al. | | |
| 9,018,886 B2 * | 4/2015 | Iwashita | ............... | G05B 19/404 318/630 |
| 9,067,091 B2 | 6/2015 | Caliendo et al. | | |
| 9,116,516 B2 * | 8/2015 | Mullin | ............... | G05B 19/0428 |
| 9,152,142 B2 * | 10/2015 | Tezuka | ................ | G05B 19/404 |
| 9,168,828 B2 | 10/2015 | Bourqui | | |
| 9,219,394 B2 | 12/2015 | Caliendo et al. | | |
| 9,254,742 B2 | 2/2016 | Chappex | | |
| 9,525,373 B2 * | 12/2016 | Shimura | ............... | H02K 11/225 |
| 9,541,916 B2 * | 1/2017 | Nakamura | ........... | G05B 19/404 |
| 9,645,565 B2 * | 5/2017 | Nilsson | .................. | B25J 9/1641 |
| 9,658,608 B2 * | 5/2017 | Nagaoka | ............... | G05B 13/042 |
| 9,815,161 B2 * | 11/2017 | Lin | ........................ | B23Q 5/56 |
| 9,825,567 B2 | 11/2017 | Furlan et al. | | |
| 9,879,870 B2 * | 1/2018 | Wang | ..................... | F24F 7/08 |
| 10,112,456 B2 | 10/2018 | Kalore et al. | | |
| 10,184,681 B2 | 1/2019 | Du et al. | | |
| 10,203,687 B2 * | 2/2019 | Kunimoto | ............ | G05B 19/404 |
| 11,214,121 B2 * | 1/2022 | Bourqui | ............... | B60H 1/00857 |
| 2003/0173917 A1 * | 9/2003 | Haussecker | ............... | H02P 1/18 318/280 |
| 2003/0222617 A1 * | 12/2003 | Nakai | .................... | H02P 8/42 318/701 |
| 2006/0033464 A1 * | 2/2006 | Nakai | .................. | H02P 25/092 318/701 |
| 2006/0103339 A1 * | 5/2006 | Yamada | ................. | F16H 61/32 318/623 |
| 2008/0249691 A1 * | 10/2008 | Kawaguchi | ............. | F16H 57/12 701/50 |
| 2009/0108791 A1 * | 4/2009 | Isobe | .................... | H02P 25/22 318/561 |
| 2012/0119689 A1 * | 5/2012 | Yamada | ................. | H02P 23/18 318/630 |
| 2012/0123564 A1 | 5/2012 | Yajima et al. | | |
| 2012/0126547 A1 * | 5/2012 | Dooley | .................. | H02P 7/282 290/38 R |
| 2013/0113404 A1 | 5/2013 | Kalore | | |
| 2013/0268122 A1 | 10/2013 | Desai et al. | | |
| 2014/0046465 A1 | 2/2014 | De Oliveira Antunes et al. | | |
| 2014/0062378 A1 * | 3/2014 | Iwashita | ................ | B23Q 23/00 318/630 |
| 2014/0197773 A1 * | 7/2014 | Ikai | ..................... | G05B 19/404 318/630 |
| 2014/0222186 A1 * | 8/2014 | Wada | ................... | G05B 19/404 700/114 |
| 2014/0239868 A1 * | 8/2014 | Monari | ................ | G05B 19/416 318/494 |
| 2014/0295750 A1 | 10/2014 | Anderson et al. | | |
| 2014/0346380 A1 | 11/2014 | Bourqiu | | |
| 2014/0379102 A1 | 12/2014 | Tian et al. | | |
| 2015/0155812 A1 * | 6/2015 | Jang | ........................ | B60L 15/20 701/22 |
| 2015/0212505 A1 | 7/2015 | Songkakul et al. | | |
| 2017/0149300 A1 | 5/2017 | Bourqui | | |
| 2017/0246932 A1 | 8/2017 | Bourqui | | |
| 2018/0340705 A1 | 11/2018 | Bottger et al. | | |

FOREIGN PATENT DOCUMENTS

| | | | | |
|---|---|---|---|---|
| CN | 105091206 A | | 11/2015 | |
| DE | 3635442 A1 * | 4/1987 | .......... | G05B 19/291 |
| DE | 276338 A1 * | 8/1988 | .......... | G05B 19/404 |
| DE | 0345665 A1 * | 12/1989 | .......... | G05B 19/351 |
| DE | 4331384 A1 * | 3/1995 | ........ | B60H 1/00857 |
| GB | 2019611 A * | 10/1979 | ............ | G05B 19/23 |

(56) References Cited

FOREIGN PATENT DOCUMENTS

| | | | | |
|---|---|---|---|---|
| GB | 2538019 A | * | 11/2016 | ......... B60H 1/00857 |
| JP | 2004350460 A | | 12/2004 | |
| JP | 2010215369 A | | 9/2010 | |

* cited by examiner

METHOD FOR DRIVING AN ACTUATOR OF AN HVAC SYSTEM

CROSS REFERENCE TO RELATED APPLICATIONS

This application is a Divisional of co-pending application Ser. No. 15/442,045, filed on Feb. 24, 2017, for which priority is claimed under 35 U.S.C. § 120; and this application claims priority of Application No. 1603283.1 filed in United Kingdom on Feb. 25, 2016 under 35 U.S.C. § 119; the entire contents of all of which are hereby incorporated by reference.

FIELD OF THE INVENTION

The present invention relates to a method for driving an actuator of a HAVC system. The method is cable of reducing noise from a heating, ventilation, and air conditioning (HVAC) system, and eliminating or reducing over-powering of an actuator of an HVAC system, in particular for HVAC systems in motor vehicles. The invention further relates to an HVAC system capable of performing said method.

BACKGROUND OF THE INVENTION

HVAC systems are used to control for climate control, such as in motor vehicles. Such HVAC systems utilise vent flaps which can control a flow of air into or through an area to effect the climate control. The positions of the vent flaps are typically controlled by one or more actuators, positioning the vent flaps so as to alter an air flow emergent from the HVAC system.

Generally, each such actuator is formed having an electric motor adapted to control a gear chain through an actuator housing. The gear chain is then generally directly or indirectly connected to levers which interact with the vent flaps, such that the actuation of the actuator can be transmitted to effect positional change of the vent flaps.

Such HVAC systems, having a series of interlinked mechanical components, have natural regions of mechanical play, wherein at least part of the actuation must be used to relieve slack in the system before any force can be transferred to the vent flaps. This is most noticeable when the actuator is accelerated from zero velocity, such as on initialisation of the actuator, or on directional change. During the regions of mechanical play, the load on the actuator is relatively low, and this manifests as a noise output from the HVAC system; the actuator accelerates quickly during the regions of mechanical play, resulting in the mechanical components contacting one another with relatively high kinetic energy.

SUMMARY OF THE INVENTION

The present invention seeks to provide a method for driving an actuator of an HVAC system and an HVAC system capable of performing said method which are capable of overcoming or obviating the above-referenced problems.

The present invention provides a method for driving an actuator of an HVAC system having a region of mechanical play, the method comprising the steps of: a] monitoring a position of a movable member of the HVAC system or at least one rotatable element of the actuator to determine when the region of mechanical play has been entered or exited; and b] ramping a drive power to the actuator between a zero-velocity drive power and a steady-state-velocity drive power during the region of mechanical play.

Preferably, the actuator comprises a motor having a rotor, and the region of mechanical play is a region where the rotor has a lost motion caused by gaps between mechanical components.

Preferably, the method further comprises a step prior to the step a] of determining the region of mechanical play.

Preferably, an information of the mechanical play is pre-programmed.

Preferably, the information of the mechanical play is determined by machine learning during operation or pre-testing of the HVAC system.

Preferably, the method further comprises a step prior to the step a] of obtaining a parameter representing the region of the mechanical play, and wherein, during the step b], the drive power is ramped according to the parameter.

Preferably, the actuator comprises a motor having a rotor, and the parameter is a total rotation angle of the rotor representing the region of the mechanical play; and during the step b], a change of the drive power is based on the total rotation angle of the rotor.

Preferably, the actuator comprises a motor having a rotor, during the step a], monitoring a position of the rotor to determine when the region of mechanical play has been entered or exited.

Preferably, during the step a], the position of rotor is monitored via a position sensor associated with the actuator.

Preferably, the step a] further comprises monitoring directionality of a travel of the actuator.

BRIEF DESCRIPTION OF THE DRAWINGS

FIG. 3b shows a qualitative graph of the rotor velocity of the actuator of the HVAC system of FIG. 1 if a drive power is supplied in accordance with those shown in FIG. 3a, the dashed upper curve showing the rotor velocity if powered in accordance with the dashed curve of FIG. 3a, and the solid lower curve showing the rotor velocity if powered in accordance with the solid curve of FIG. 3a;

DETAILED DESCRIPTION OF THE PREFERRED EMBODIMENTS

Figure 1:
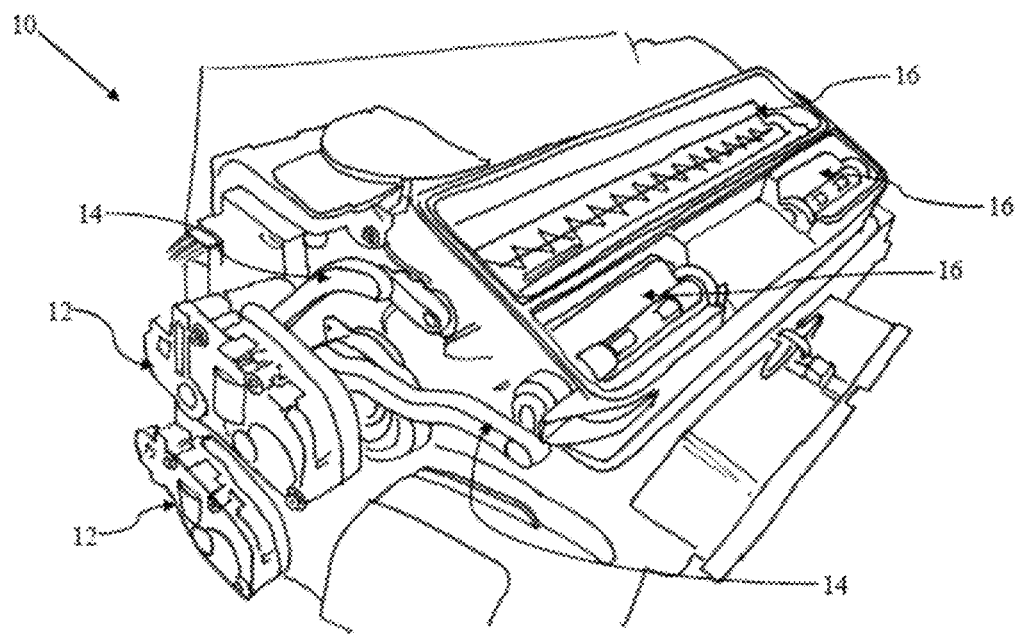
FIG. 1 shows a perspective representation of the preferred embodiment of an HVAC system in accordance with the second aspect of the invention.

Referring firstly to FIG. 1, there is shown an HVAC system globally at 10 which is arranged to substantially reduce the noise output thereof. The HVAC system 10 indicated is shown as part of the climate control system of a motor vehicle, though it will be appreciated that the present invention could be utilised in any context in which an HVAC system is utilised.

The HVAC system 10 includes at least one actuator 12; here two actuators 12 are shown, which may be singularly or separately controlled, though it will be apparent that any number of actuators could be supplied, depending upon the requirements of the HVAC system 10. Each actuator 12 is in communication with a movable member, such as the levers 14 illustrated, which are in turn associated with actuatable vent flaps 16 which can control the passage of air through the HVAC system 10. Whilst singular, unitarily formed levers 14 are shown, other forms of movable member could be provided, such as gear trains. In any event, the mechanical train from the actuators 12 to their respective vent flaps 16 introduces a region of mechanical play, wherein the load on the actuator 12 is reduced during movement, resulting in ineffective transfer of force.

Figure 2:
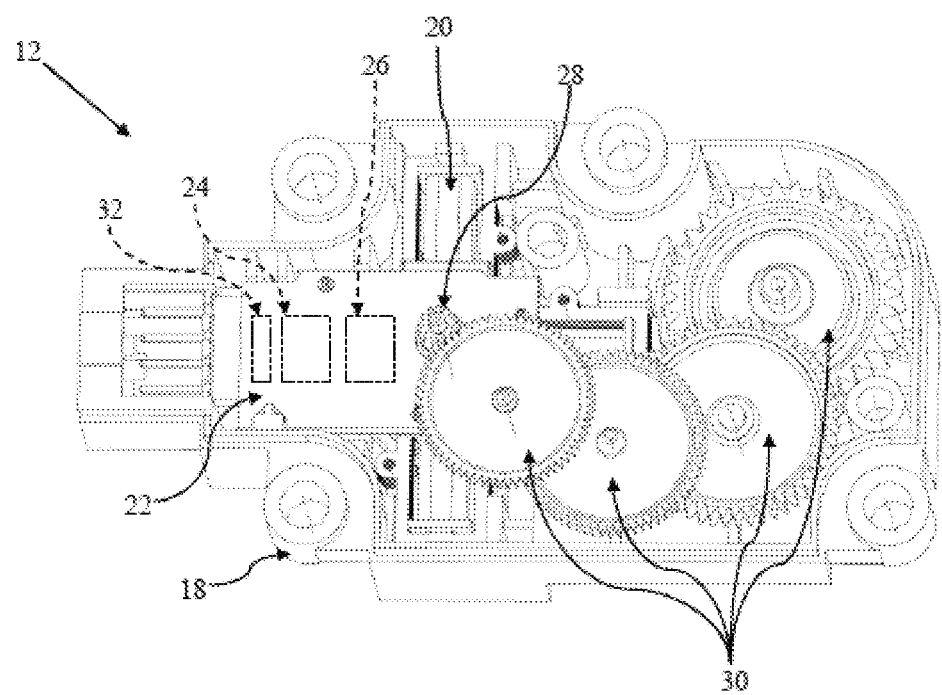
FIG. 2 shows a perspective representation of the preferred embodiment of one actuator of the HVAC system of FIG. 1.

FIG. 2 shows the actuator 12 in more detail, a cover of an actuator housing 18 having been removed to show the components therein. The actuator 12 illustrated includes a drive mechanism, preferably an electric motor 20 as shown, which can be controlled by a, preferably onboard, controller 22.

Figure 6:
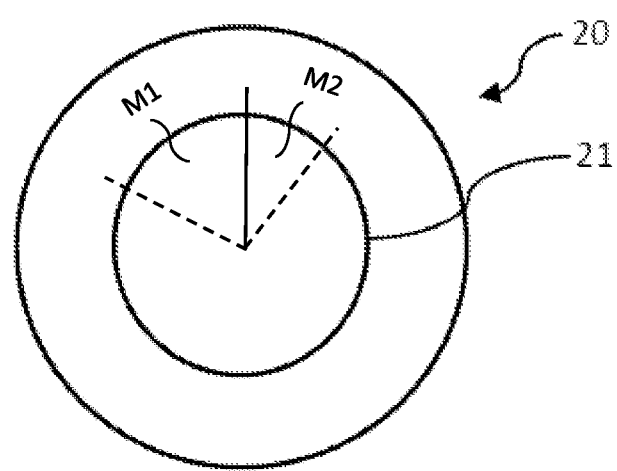
FIG. 6 is an exemplary diagrammatic representation of a motor of the actuator show in FIG. 2.

The controller 22 may preferably be associated with a position sensor 24, which is capable of determining the position of a rotor 21 shown in FIG. 6 of the electric motor 20, and thereby allow for indirect calculation of the relative position of the vent flaps 16 in order to determine control commands. It will be apparent, however, that some form of position sensor could be provided elsewhere in the mechanical train. For instance, a position sensor could be engaged with the levers 14 or the vent flaps 16 if desired. In the present embodiment, the position sensor 24 is formed as a Hall sensor capable of readily determining the relative angular position of the rotor 21 of the electric motor 20.

The controller 22 may also include a memory circuit 26 which is capable of storing informations relating to the region of mechanical play in the HVAC system 10 to the controller 22. This allows for the controller to account for the mechanical play in the system when sending commands to the actuator 12. This information may take the form of correlation data between a given rotor position and the expected or calculated mechanical play or slack which would be experienced for said rotor position. Furthermore, there may be directionality information stored within the memory circuit 26; the magnitude of mechanical play may be different depending upon the direction in which the rotor 21 had been previously rotated, for example, and the directionality information may be necessary in order to calculate the expected mechanical play. An exemplary representation of the region of mechanical play is shown in FIG. 6, when the rotor 21 is rotated in a first rotating direction, such as a counterclockwise direction, the magnitude of the region of mechanical play is represented by M1; when the rotor 21 is rotated in a second rotating direction, such as a clockwise direction, the magnitude of the region of mechanical play is represented by M2.

The electric motor 20 includes an output 28 via which drive can be transferred out of the actuator 12. In the present embodiment, this output 28 comprises a toothed gear which is part of a gear train 30. Other drive transmission means may be considered, however. For example, a worm gear could be utilised in lieu of the gear train 30.

Mechanical play is a lost motion of the movable member in the HVAC system caused by many gaps between the mechanical components. By obtaining a parameter representing the region of mechanical play, such as positions and lengths of the gaps, total rotation angle of at least one rotatable element of the actuator corresponding to the region of mechanical play, the change of the drive power can be optimized according to the parameter.

Preferably, using the position sensor 24 to detect a position of at least one rotatable element of the actuator 12 or a position of at least one movable member of the HAVC system 10, and calculating a velocity of the rotatable element or a velocity of the movable member. Suddenly changes in the velocity of the rotatable element or the movable member can be used to identify the beginnings and endings of the region of mechanical play, so a total rotation angle of the rotatable element or a total rotation angle of the movable member representing the region of mechanical play can be obtained through a series of tests. The at least one rotatable element can be a rotor 21 of the motor 20, the output 28, or any gear of the gear train 30. The movable member can be the lever 14, the vent flap 16, or any movable member directly or indirectly interacts with the actuator 12.

The HVAC system 10 is controllable so as to reduce the noise emitted as the components thereof clash during the region of mechanical play. The simplest scenario in which this can be considered is in the initialisation of the actuator 12.

When the HVAC system 10 is first activated, the actuator 12 will be stationary, and there will likely be some effects due to mechanical play in the actuator 12, levers 14 and flaps 16. In the art, the electric motor of an actuator would be brought up to full speed by driving the actuator at full power P1. This can be visualised from the dashed upper curve DP in FIG. 3a, indicated globally at 50. As the slack in the system due to the mechanical play is overcome, the drive power will reach a steady-state condition P2.

Figure 3A:
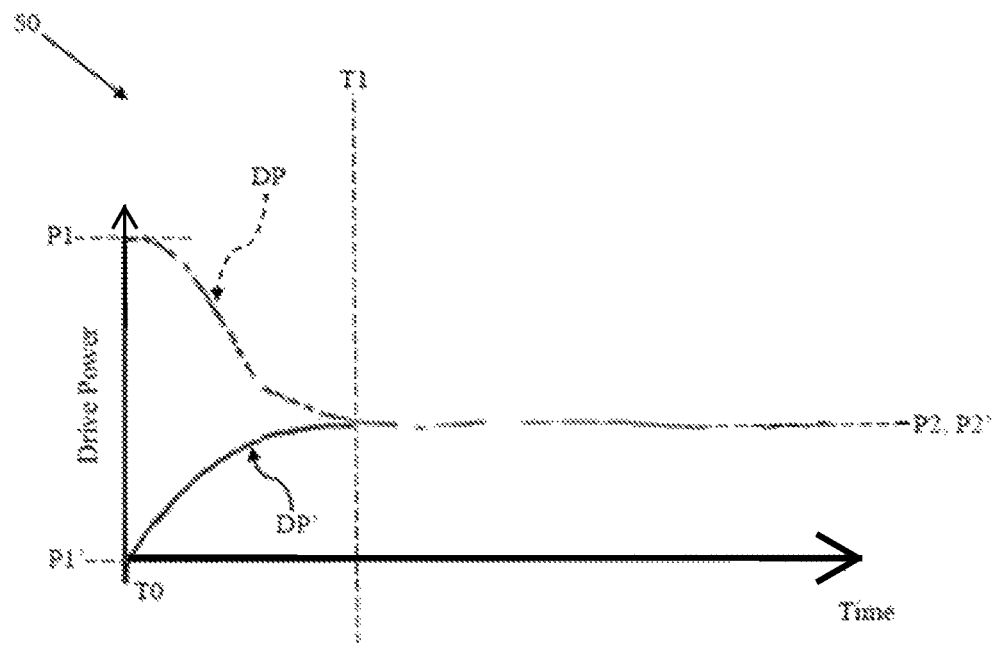
FIG. 3a shows a qualitative graph of the drive power as supplied to the actuator of the HVAC system of FIG. 1 versus time, the dashed upper curve showing the drive power supplied in the prior art, and the solid lower curve showing the drive power supplied using a method in accordance with the first aspect of the invention.
Figure 3B:
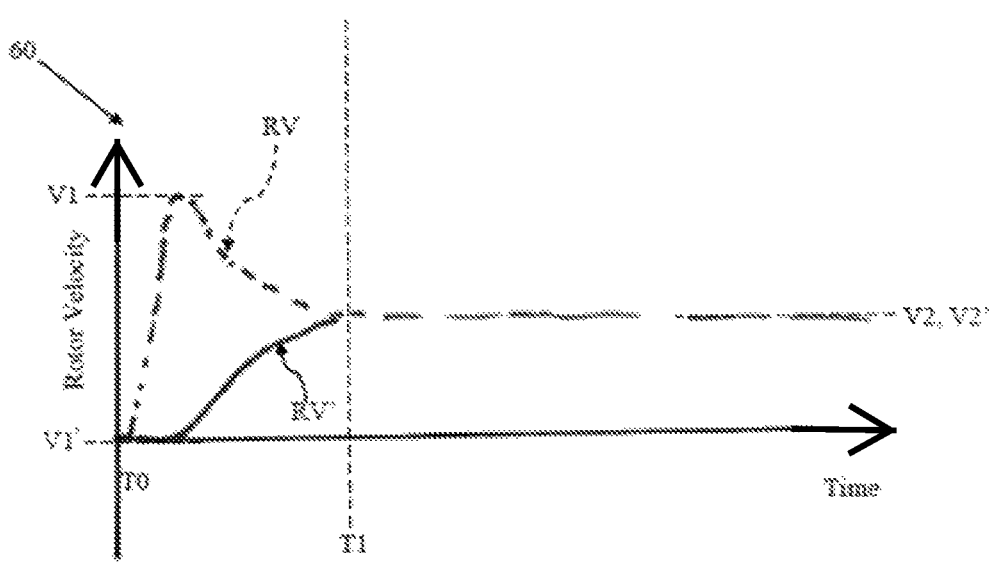

During the period of low-load on the system, that is, between times TO and T1 indicated in FIG. 3a, the noise emitted from the HVAC system is relatively high, being proportional to the drive power. The rotor velocity of such a system can be seen at the dashed line RV in FIG. 3b, indicated globally at 60; the rotor accelerates quickly to a peak velocity V1 whilst the load is minimal, and then stabilises to a steady-state velocity V2.

In the present embodiment, the controller 22 sends an actuation command to the electric motor 20, that is, an activation command. However, based on the position of the actuator 12, levers 14 and/or vent flaps 16, as measured by the position sensor 24, and potentially also the knowledge of the region of mechanical play, the controller 22 may be able to calculate a required acceleration of the rotor 21 of the electric motor 20 so as to correctly move the vent flaps 16. The controller 22 can do this in a controlled manner by ramping, preferably in a slow, smooth manner, the drive power supplied to the electric motor 20 from a zero-velocity drive power P1' to a steady-state-velocity drive power P2', as shown by the solid line DP'. This in turn effects the required acceleration without or substantially without over-powering of the actuator 12 to thereby reduce a noise emitted by the HVAC system 10. The respective rotor velocity RV' can be seen at the solid line in FIG. 3b, which ramps from zero velocity V1' to a steady-state velocity V2'.

As can be seen, since the drive power supplied to the electric motor 20 is such that the steady-state-velocity drive power P2' is never exceeded, the over-powering of the system associated with existing HVAC systems never occurs, and therefore no excess noise is produced beyond that which would be produced under the steady state condition.

It will be appreciated that the reverse methodology can be applied to the deactivation of the actuator 12 of the HVAC system 10. Rather than abruptly stopping the actuator 12 when a target position of the vent flaps 16 has been achieved, which may result in over-powering as the load on the actuator 12 decreases, the drive power can be slowly ramped down over time by the controller 22. This has the effect of producing a smooth stop of the actuation of the vent flaps 16, thereby reducing the noise produced by the whole HVAC system.

Figures 4, 5:
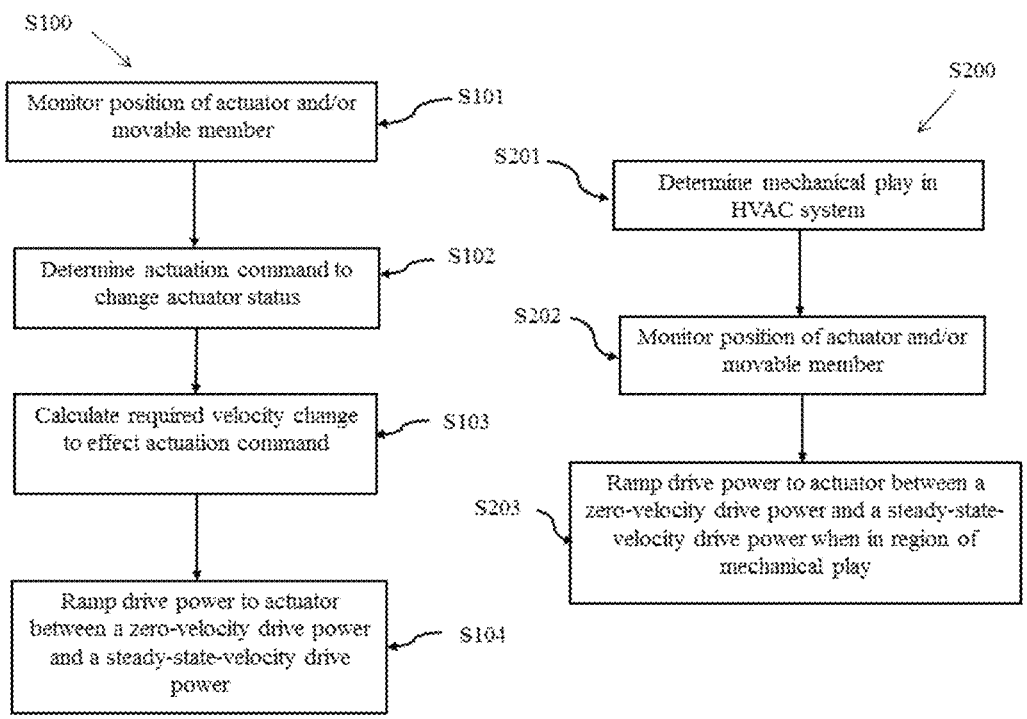
FIG. 4 shows a diagrammatic representation of the first embodiment of a method for driving an actuator of an HVAC system in accordance with the invention.
FIG. 5 shows a diagrammatic representation of the second embodiment of a method for driving an actuator of an HVAC system in accordance with the invention.

As such, the first embodiment of method for driving the actuator 12 of the HVAC system 10 is therefore illustrated in FIG. 4, indicated globally at S100. The position of a movable member 14, 16 and/or the position of at least one rotatable element of the actuator 12 of the HVAC system 10 can be monitored, step S101, for instance, using a position sensor 24 such as the Hall sensor. An actuation command can then be determined, step S102, to effect an actuation of the actuator 12, such as acceleration or deceleration as may be achieved on activation, deactivation or directional change of the actuator 12.

A required acceleration or deceleration of the actuator 12 can then be calculated, step S103 which is capable of performing the actuation command through the mechanical train to the vent flaps 16, and, using a command from the controller 22, a drive power to the actuator can be ramped, step S104, between a steady-state-velocity drive power P2' and a zero-velocity drive power P1' to effect the required acceleration or deceleration without or substantially without over-powering of the actuator 12 to thereby reduce a noise emitted by the HVAC system 10. This may be performed automatically as soon as a region of mechanical play is entered, for example.

The term zero-velocity drive power P1' is intended to refer to a state in which the actuator 12 is stationary; however, it will be clear that this is not necessarily zero power, since some actuators may require the presence of a holding current in order to maintain an actuator position. Furthermore, a steady-state-velocity drive power P2' is intended to refer to a drive power required to effect motion of the movable member under a standard load, that is, not under a reduced load which would be experienced ordinarily in the region of mechanical play of the HVAC system 10.

It may be possible to pre-store the memory circuit 26 with information regarding the exact position of the region of mechanical play in the HVAC system 10, based on its manufacturing parameters, for example, tolerance in the levers 14. This may be achieved by, for example, pre-testing of the HVAC system 10 in a learning phase, prior to installation and/or first operation of the HVAC system 10, allowing the mechanical play to be scanned or tested. However, it may additionally or alternatively be beneficial to introduce a form of machine learning into the controller 22 logic, such that it is capable of calculating the position of the region of mechanical play during operation, possibly by measurement of the load on the actuator 12 with respect to the measured position by the position sensor 24 and or based on any measured directional information. Preferably, by obtaining a parameter representing the region of the mechanical play, such as positions and lengths of the gaps, total rotation angle of at least one rotatable element of the actuator corresponding to the mechanical play, the required acceleration or deceleration can be calculated according to the parameter.

Preferably, using the position sensor 24 to detect a position of at least one rotatable element or a position of at least one movable member, and calculating a velocity of the rotatable element or a velocity of the movable member. Suddenly changes in the velocity of the rotatable element or the movable member can be used to identify the beginnings and endings of the region of mechanical play, so a total rotation angle of the rotatable element or a total rotation angle of the movable member representing the region of mechanical play can be obtained through a series of tests.

It will be apparent that if the information related to region of mechanical play and/or the required acceleration and/or deceleration based upon the region of mechanical play are prestored in the memory circuit 26, the step S101 and the step S103 in the FIG. 4 are not necessary, directly ramping the drive power to actuator according to the required acceleration or deceleration during the step S104.

The memory circuit 26 becomes more useful during normal operation of the HVAC system 10, in which directional changes of the vent flaps 16 may be more common than the activation and/or deactivation commands. Where directional changes occur, there will, at some point, be a passage through the region of mechanical play in which over-powering of the actuator 12 would ordinarily be a concern. In such a condition, it becomes more important to know exactly where the mechanical play is in order for the controller 22 to be able to ramp the drive power up or down in order to accelerate or decelerate the actuator 12 between the zero-velocity drive power P1' and the steady-state-velocity drive power P2' or vice versa.

As such, it will be apparent that initial activation and final deactivation of the actuator 12 using ramped control of the drive power may be performed independently of the knowledge of the region of mechanical play in the HVAC system 10; it will always be assumed that there will be some play in the HVAC system 10 under these conditions. In a scenario of initial activating the actuator 12, only the step S101 and the step S104 are necessary. During the step S101, monitoring the position of the movable member to determine whether the movable member begins moving. During the step S104, the drive power is increased from a zero-velocity drive power until the movable member begins moving, thereby minimising the noise from the HVAC system 10 and the drive power for the actuator 12.

The position of the region of mechanical play is important during the normal operation of the actuator 12, particularly during a directional change. At any given point, the rotor 21 of the electric motor 20 may come to a halt such that, upon activation there is only a certain percentage of the mechanical play in the system which must be accounted for when ramping the drive power. The soft-starting of the actuator 12 ensures that regardless of the position of the region of mechanical play, it is not brought up to full rotor velocity RV' until the gear train 30 has been fully engaged.

It will also be clear that the method of the present invention is not only capable of reducing the noise produced by an HVAC system 10, but is also capable of reducing an over-powering of the actuator 12 when there is a low load on the system. The second embodiment of method for driving the actuator 12 of the HVAC system 10 is therefore illustrated in FIG. 5, indicated globally at S200.

Firstly, a region of mechanical play in a movable member 14, 16 of the HVAC system 10 which is associated with the actuator 12 can be determined, step S201. This may be pre-programmed into the controller 22, or determined during use of the HVAC system 10 using machine learning. A position of the movable member 14, 16 and/or the position of at least one rotatable element of the actuator 12 can be monitored, step S202 so as to determine when region of mechanical play has been entered or exited, and a drive power to the actuator 12 can be ramped, step S203, between a steady-state-velocity drive power P2' and a zero-velocity drive power P1' during the region of mechanical play so as to eliminate or reduce over-powering of the actuator 12.

It is therefore possible to provide a method of controlling the actuator of an HVAC system so as to reduce the noise emitted therefrom, and also to reduce the energy consumption of the device by eliminating or reducing over-powering of the actuator. This can be achieved by providing logic within a controller which is arranged to provide a soft-start to the actuator, in particular so as to accommodate the mechanical play within the system which would otherwise result in a low load on the actuator in use.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A method for driving an actuator of an HVAC system having a region of mechanical play, the method comprising the steps of:
   a] determining the region of mechanical play;
   b] after completing step a], monitoring a position of at least one rotatable element of the actuator to determine when the region of mechanical play has been entered or exited;
   c] ramping a drive power to the actuator between a zero-velocity drive power and a steady-state-velocity drive power during the region of mechanical play; and
   during the step c], calculating a required velocity change of the actuator based on at least a parameter representing the region of mechanical play.

2. The method as claimed in claim 1, wherein, during the step a], an information of the mechanical play is pre-programmed, so to determine the region of mechanical play.

3. The method as claimed in claim 1, wherein, the information of the mechanical play is determined by machine learning during operation or pre-testing of the HVAC system.

4. The method as claimed in claim 1, wherein, during the step a], the region of mechanical play is determined through obtaining a parameter representing the region of the mechanical play, and wherein, during the step c], the drive power is ramped according to the parameter.

5. The method as claimed in claim 1, wherein the step b] further comprises monitoring directionality of a travel of the actuator.

6. The method as claimed in claim 1, wherein, the actuator comprises a motor, and during the step a], determining the region of mechanical play, wherein magnitudes of mechanical play are different if a motor direction is different than a previous motor direction.

7. The method as claimed in claim 1, wherein the actuator comprises a motor having a rotor, and during the step b], monitoring a position of the rotor to determine when the region of mechanical play has been entered or exited.

8. The method as claimed in claim 7, wherein, during the step b], the position of rotor is monitored via a position sensor associated with the actuator.

* * * * *